United States Patent
Fey

(10) Patent No.: US 9,457,904 B1
(45) Date of Patent: Oct. 4, 2016

(54) SLEEPING PLATFORM FOR USE ON AIRCRAFT

(71) Applicant: Robert Karl Fey, Anacortes, WA (US)

(72) Inventor: Robert Karl Fey, Anacortes, WA (US)

( * ) Notice: Subject to any disclaimer, the term of this patent is extended or adjusted under 35 U.S.C. 154(b) by 0 days.

(21) Appl. No.: 14/990,387

(22) Filed: Jan. 7, 2016

(51) Int. Cl.
*B64D 11/00* (2006.01)

(52) U.S. Cl.
CPC ....... *B64D 11/00* (2013.01); *B64D 2011/0069* (2013.01)

(58) Field of Classification Search
CPC .... A47C 17/08; A47C 16/00; A47C 20/026; B60N 2/34; B60N 3/008; B60N 3/004; B64D 11/00; B64D 2011/0069; B64D 2011/0076; A61G 13/009; A61G 13/121; A61G 13/105; A61G 15/125; A61G 13/04; A47B 2023/049; A47B 23/043; A47B 3/08; A47B 3/0803
See application file for complete search history.

(56) References Cited

U.S. PATENT DOCUMENTS

| | | | | |
|---|---|---|---|---|
| 2,451,607 A * | 10/1948 | Binash | ................. | A61G 13/009 606/245 |
| 2,661,989 A * | 12/1953 | Weilaud | ............... | A61G 13/102 5/606 |
| 2,683,069 A * | 7/1954 | Kimmel | ................... | A47B 3/08 108/125 |
| 2,690,942 A * | 10/1954 | Marcus | ................ | A47B 3/0815 108/132 |
| 3,739,406 A * | 6/1973 | Koetter | ................... | A61G 7/005 5/149 |
| 3,814,414 A * | 6/1974 | Chapa | ...................... | A61B 6/04 128/873 |
| 4,006,499 A * | 2/1977 | Young | .................... | A61G 7/002 5/608 |
| 4,635,914 A * | 1/1987 | Kabanek | ................ | A61G 13/12 5/601 |
| 4,681,042 A * | 7/1987 | Roberts | .................. | A47B 27/18 108/6 |
| 4,927,128 A * | 5/1990 | O'Brian | ................. | A47B 3/087 108/36 |
| 4,943,041 A * | 7/1990 | Romein | ................. | A47B 3/083 108/36 |
| 5,303,890 A | 4/1994 | Carruth | | |
| 5,335,676 A * | 8/1994 | O'Brien | ................. | A47B 3/087 108/128 |
| 5,645,319 A | 7/1997 | Parks | | |
| 6,055,911 A * | 5/2000 | Krenzer | ................. | B60N 3/004 108/44 |
| 6,142,699 A * | 11/2000 | Pao | ....................... | F16B 7/1454 403/109.5 |
| 6,305,869 B1 * | 10/2001 | Chen | ...................... | B62K 3/002 280/87.041 |
| 6,647,573 B2 | 11/2003 | Corbin | | |
| 6,805,403 B2 | 10/2004 | Buch | | |
| 8,011,731 B2 | 9/2011 | Goddu | | |
| 8,528,970 B2 | 9/2013 | Edalati et al. | | |
| 8,850,642 B2 | 10/2014 | Rasmussen | | |
| 8,914,926 B2 | 12/2014 | Berhanu | | |
| 9,150,130 B2 | 10/2015 | Jackow | | |
| 2002/0050009 A1 * | 5/2002 | Ley | ........................ | A47C 16/00 5/657 |
| 2003/0177957 A1 * | 9/2003 | Ibrahim | ............. | A47B 21/0314 108/6 |
| 2004/0133983 A1 * | 7/2004 | Newkirk | ............ | A61G 13/0036 5/624 |
| 2006/0248648 A1 * | 11/2006 | Kratzmaier | ............ | A61G 13/02 5/600 |
| 2008/0303318 A1 * | 12/2008 | Hamilton | ............... | A47C 16/00 297/129 |

(Continued)

FOREIGN PATENT DOCUMENTS

| | | |
|---|---|---|
| DE | 3942629 A1 | 6/1991 |
| DE | 102009007384 A1 | 8/2009 |
| WO | 2015014258 A1 | 2/2015 |

*Primary Examiner* — David E Sosnowski
*Assistant Examiner* — Eric Kurilla
(74) *Attorney, Agent, or Firm* — Schacht Law Office, Inc.; Dwayne E Rogge

(57) ABSTRACT

Disclosed herein is a sleeping platform for use on aircraft comprising: a substantially planar base panel having a vertically upper surface and a vertically lower surface. A padded layer is provided covering the base panel and a plurality of support legs are pivotably attached to the vertically lower surface of the base panel. One of each of the plurality of support legs may be on opposing longitudinal ends of the base panel; each support leg having a horizontal and transverse pivot axis.

3 Claims, 2 Drawing Sheets

(56) References Cited

U.S. PATENT DOCUMENTS

| | | | |
|---|---|---|---|
| 2010/0138997 A1* | 6/2010 | Hoppner | A61G 7/002 5/601 |
| 2010/0155346 A1 | 6/2010 | Cheng | |
| 2010/0223728 A1* | 9/2010 | Hutchison | B66F 3/06 5/610 |
| 2010/0257673 A1* | 10/2010 | Linares | A61G 1/013 5/626 |
| 2011/0010858 A1* | 1/2011 | Tesar | A61G 7/005 5/608 |
| 2011/0277238 A1* | 11/2011 | Mabry | A47C 16/00 5/112 |
| 2012/0012431 A1* | 1/2012 | Hamilton | A45C 13/262 190/18 A |
| 2012/0186499 A1* | 7/2012 | Chen | A47B 23/043 108/50.13 |
| 2012/0271350 A1* | 10/2012 | Palmer | A61G 13/009 606/242 |
| 2013/0055929 A1* | 3/2013 | Peery | A47B 7/02 108/91 |
| 2013/0232696 A1 | 9/2013 | Halimi et al. | |
| 2014/0250598 A1* | 9/2014 | Sharps | A61G 13/04 5/608 |
| 2014/0359941 A1* | 12/2014 | Sharps | A61G 13/04 5/610 |
| 2015/0059089 A1* | 3/2015 | Falkiner | B60N 2/2854 5/110 |

* cited by examiner

SLEEPING PLATFORM FOR USE ON AIRCRAFT

BACKGROUND OF THE DISCLOSURE

Field of the Disclosure

This disclosure relates to the field of cushions specifically adapted for use on the tray tables of commercial aircraft and similar platforms.

BRIEF SUMMARY OF THE DISCLOSURE

Disclosed herein is a sleeping platform for use on aircraft comprising: a substantially planar base panel having a vertically upper surface, first longitudinal end and second longitudinal ends, front end, rear end, and vertically lower surface; a padded layer covering the base panel; a plurality of support legs pivotably attached to the vertically lower surface of the base panel; one of each of the plurality of support legs on opposing longitudinal ends of the base panel; each support leg having a horizontal and transverse pivot axis.

The sleeping platform may further comprise a vertical height adjustor on each of the plurality of support legs.

The sleeping platform may be arranged wherein each leg comprises: an upper section and a lower section, one slidably engaging into the other; and a clamping mechanism secures the upper section to the lower section.

DETAILED DESCRIPTION OF THE DISCLOSURE

Figure 1:
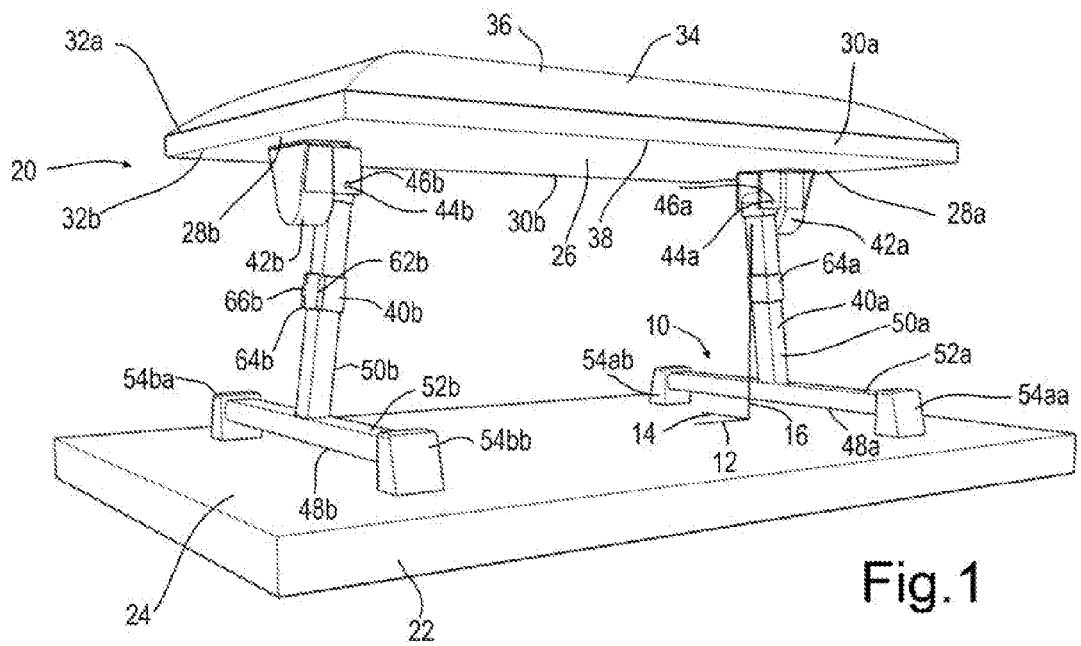
FIG. 1 is a front isometric view of one example of the disclosed sleeping platform for use on aircraft in a first configuration.

Disclosed herein is a is a sleeping platform 20 which is configured to be used by a passenger of a commercial vehicle or in similar applications where it is desired to rest one's head above a stationary platform, such as the passenger trays commonly attached adjacent to passenger seats. For example; commercial aircraft commonly utilize passenger seats having a passenger tray 22 affixed to the back of a forward passenger seat, adjacent bulkhead, arm rest of a passenger seat, or other structures, as is well known in the art. These passenger trays 22 generally have a substantially planar upper surface 24 upon which a passenger will rest food, drinks, magazines etc. during transport. For these purposes, the upper surface 24 is generally hard and thus is not comfortable for laying one's head on when it is desired to rest. For this purpose, pillows, and blankets are often provided. However; as the passenger tray 22 is often generally at the waist level of a passenger sitting in the passenger seat, and as the horizontal distance between the back of the passenger seat and the passenger tray 22 is often a very short distance (less than the torso length of an adult), it takes a substantial number of pillows and/or blankets to achieve the desired vertical height for passenger comfort. Thus, passengers are often resorted to using pillows to rest their heads on vertical surfaces such as adjacent bulkheads, or head rest wings, these providing a very uncomfortable sleeping arrangement for passengers.

Similarly, in other environments such as waiting rooms, classrooms, tables, standalone trays, and other similar structures do not provide a padded surface at the desired vertical orientation for resting of one's head, or feet.

Disclosed herein is a sleeping platform 20 having a base panel 26 with a first longitudinal end 28a and a longitudinally opposed second longitudinal end 28b. The base panel 26 also having a front edge 30a and a transversely opposed rear edge 30b. As shown in this example, each of the front edge 30a and rear edge 30b are substantially longer than each of the first longitudinal end 28a and second longitudinal end 28b. In one example, the longitudinal dimension of the base panel 26 is between 10 inches and 20 inches. In a similar example, the transverse dimension of the base panel 26 is between 5 inches and 14 inches.

As the base panel 26 is generally a substantially planar and rigid structure, having a vertically upper surface 32a and vertically lower surface 32b, it may desired to provide a padded layer 34. The padded layer 34 may be comprised of open cell foam, closed cell foam, layers of fleece material, or other compositions. In one example the padded layer has a durometer rating between 15 and 30 to maximize comfort to the passenger.

To further increase comfort, aid in ease of cleaning, and to provide a graphic interchangeable surface, a padded surface cover 36 may be removably disposed over the padded layer 34. In one example, the padded surface cover 36 has an elastic perimeter edge 38 so as to be easily removed from the other components of the sleeping platform 24 or cleaning or replacement. In one example, the padded surface cover 36 is formed of a woven or pressed fabric material such as fleece, felt, knit, or pressed materials such as Mylar or sheet polymers such as PVC etc.

To raise the base panel 26 to a desired height, a plurality of folding support legs 40a and 40b are provided on opposing longitudinal ends of the base panel 26. In this disclosure, specific examples of components may be given an alphabetic suffix to a general numeric label. For example, the support legs are generally labeled 40 and specific support legs are labeled 40a and 40b. In example shown, each support leg 40 of this example is mounted to the base panel 26 via a pivot mount 42. Each support leg 40 of this example is attached to a pivot mount 42 via a pivot 44, providing a pivot axis 46 about which the support leg 40 and associated components rotate from the extended position shown in FIG. 1 and also in FIG. 2 to the transport/storage position shown in FIG. 3 where in the lower end 48 of each of the support legs 40 is rotated to a position adjacent the face panel 26. In one form, the legs pivot past a fully vertical position 16 and contact a portion of the pivot mount 42 so that no additional pivot stop is required.

In the example shown, each support leg 40 comprises a vertical extension 50 having a cross member 52 attached thereto. Also shown in this example, feet 54 are attached at opposing transverse ends of the cross member 52. The feet 54 increasing stability of the apparatus as they contact and rest upon a support structure such as the passenger tray 22.

In one example, the vertical extensions 50 may be of a fixed length for ease in manufacture, weight reduction, and reduce cost to the consumer.

Figure 2:
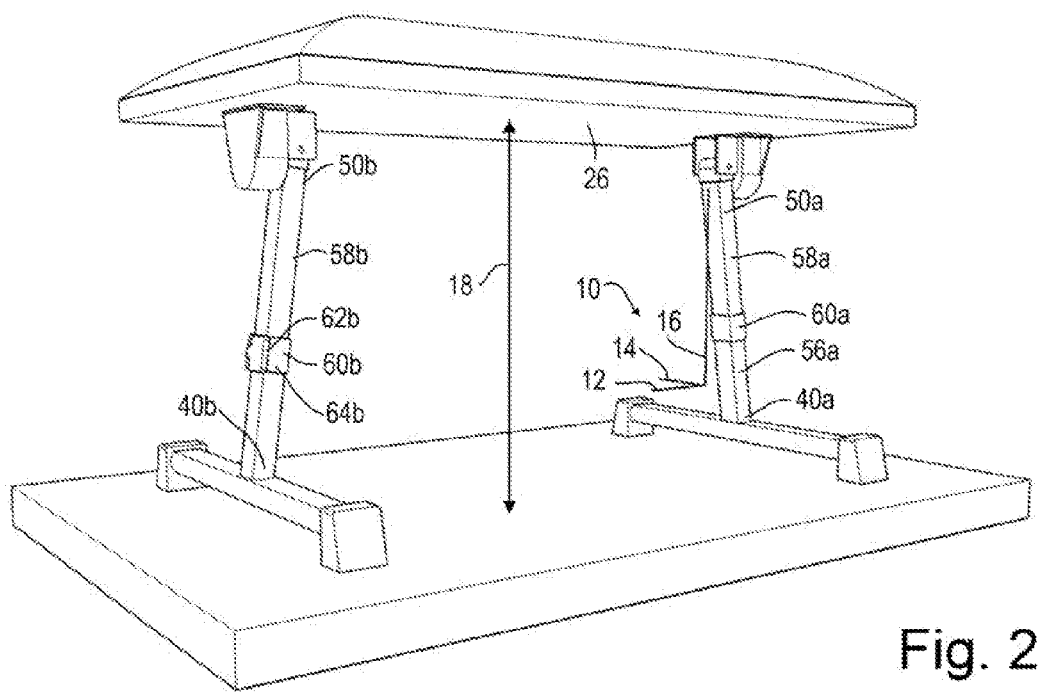
FIG. 2 shows the example of FIG. 1 in a second, raised configuration.
Figure 3:
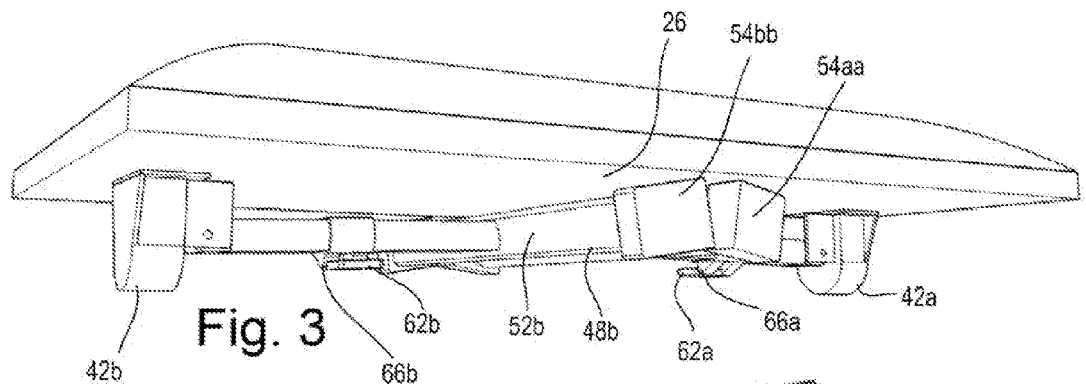
FIG. 3 shows the example of FIG. 1 in a folded, stowed configuration.
Figure 4:
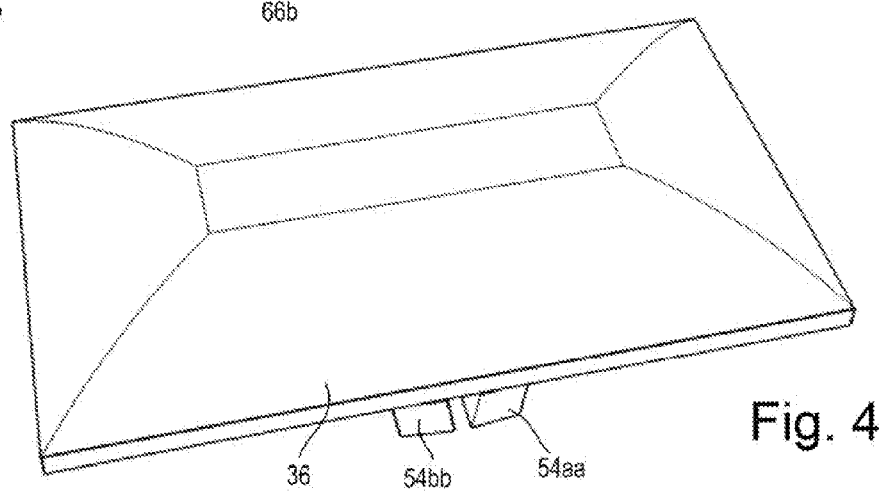
FIG. 4 is a top isometric view of the example of FIG. 3.
Figure 5:
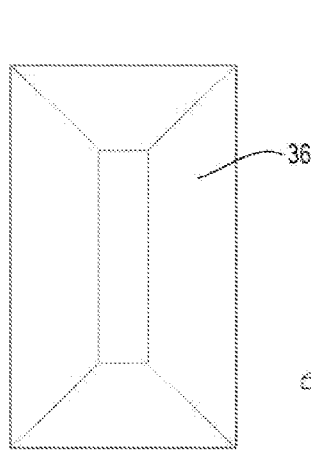
FIG. 5 is a top view of the example of FIG. 3.
Figure 6:
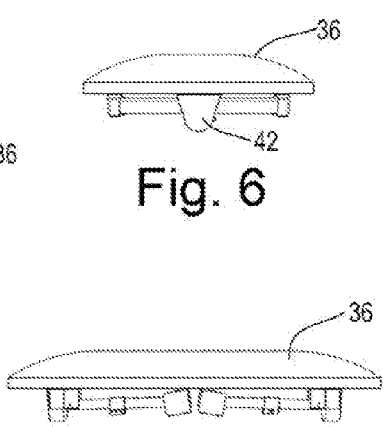
FIG. 6 is an end view of the example of FIG. 3 with the opposing end view being a mirror image thereof.
Figure 7:
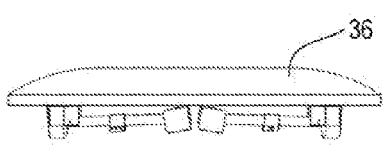
FIG. 7 is a front view of the example of FIG. 3 with the opposing rear view being a mirror image thereof.
Figure 8:
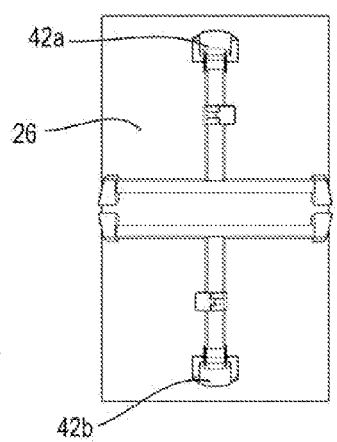
FIG. 8 is a top view of the example of FIG. 3.

In another example, as shown in FIG. 2, each of the vertical extensions 50 comprises an outer leg portion 56 and an inner leg portion 58 which slides into the outer leg portion 56 so as to provide height adjustment between the lower end 48 and the base panel 26. A vertical adjuster 60 may be provided on the outer leg portion 56 to affix the height position of the outer leg portion 56 to the inner leg portion 58.

Although other adjusters 60 may be utilized such as ball catch, threaded clamping devices, etc., a cam clamping mechanism 64 utilizing a vertical adjuster release lever 62 may be utilized wherein the clamping mechanism 64 is attached to the outer leg portion 56 and as the vertical adjuster release lever 62b is rotated about a pivot axis 66, a cam mechanism releases pressure upon the inner leg portion 58 to allow sliding of the inner leg portion 58 relative to the outer leg portion 56 until the desired height 18 between the upper surface 24 of the passenger tray 22 and the base panel 26 is achieved. Whereupon the vertical adjuster release lever(s) 62 are rotated to the position as shown in FIG. 1, thus clamping the inner leg portion 58 in position relative to the outer leg portion 56.

In the example shown, the outer leg portion 56 is shown vertically below the inner leg portion 58 however, this may be vertically reversed in some applications.

Although in the example shown a single support leg 40 is shown at opposing longitudinal ends of the base panel 26, and other examples more than one support leg 40 may be provided at each longitudinal end and need not be even with the opposing longitudinal end. For example, one longitudinal end of the sleeping platform 20 may have a single support leg 40 with or without the cross member 52, while the opposing longitudinal and may utilize two or more support legs 40.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

The invention claimed is:

1. A head rest sleeping platform for use on aircraft comprising:
    a rigid substantially planar base panel having a vertically upper surface, first longitudinal end and second longitudinal ends, front end, rear end, and vertically lower surface;
    a padded layer covering the base panel;
    a plurality of support legs having first ends pivotably attached to the vertically lower surface of the base panel and second ends distal therefrom;
    one of each of the plurality of support legs on opposing longitudinal ends of the base panel;
    each support leg having a horizontal and transverse pivot axis;
    the plurality of support legs pivotable from a folded, stowed configuration wherein the second ends of the plurality of support legs are adjacent the lower surface of the base panel to an extended configuration; and
    each of the plurality of support legs in the extended configuration with the second ends removably resting upon the upper surface of a passenger tray of the aircraft.

2. The head rest sleeping platform as recited in claim 1 further comprising a vertical height adjustor on each of the plurality of support legs.

3. The head rest sleeping platform as recited in claim 2 wherein each leg comprises:
    an upper section and a lower section, one slidably engaging into the other; and
    a clamping mechanism secures the upper section to the lower section.

* * * * *